United States Patent Office 3,249,830
Patented May 3, 1966

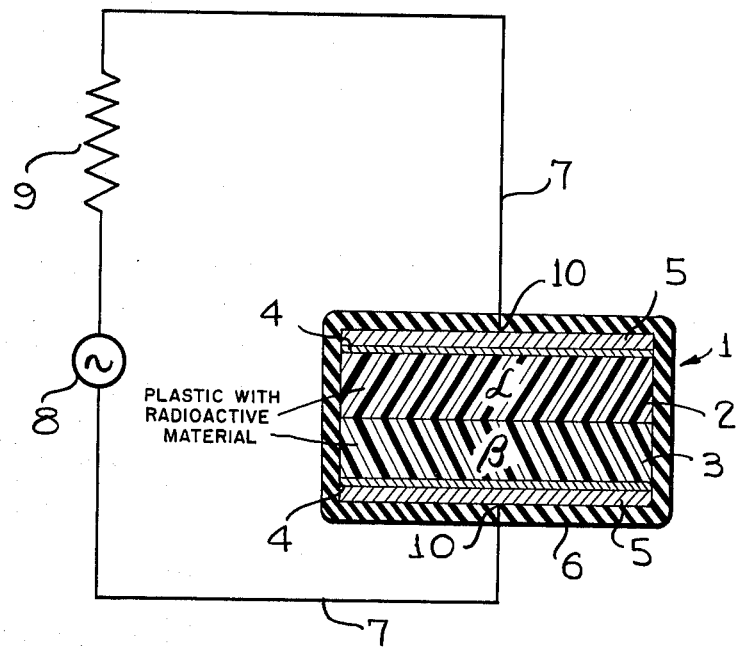

3,249,830
ORGANIC SEMI-CONDUCTOR MATERIALS AND CONTACT RECTIFIER EMPLOYING THE SAME
Leon Adany, Champigny-sur-Marne, France, assignor to Electro-Organics, Inc., New York, N.Y., a corporation of New York
Filed Jan. 9, 1962, Ser. No. 165,251
19 Claims. (Cl. 317—234)

This invention relates to organic semi-conductors, to a novel method for their preparation, and to rectifier devices employing such semi-conductors. More particularly, the invention concerns novel polymer compositions comprising a combination of a polymerized olefinically unsaturated monomer with a polymeric substituted phosphorus nitride, and to the conversion thereof into shaped articles having conductive properties.

The potential use of organic semi-conductors for transistors, batteries, and other forms of energy conversion had led to extensive study of these materials. High molecular weight organic compounds which exhibit enhanced conductivity properties are known, including, for example, pyropolymers, anthracene, polyphthalocyanines, and polyacenequinone polymers. Organic semi-conductors have also been prepared by exposing various polymers to ionizing radiation. However, the conductivity of the resulting semi-conductors has been largely dependent upon the conditions under which the irradiation was performed. Efforts have also been made to produce semi-conductors by incorporating into the body of the material an ionizing radiation emissive substance. The results have thus far been unsatisfactory and undependable, being especially subject to the composition and degree of polymerization of the material treated. It has been suggested that a desirable range of conductivity for organic semi-conductors may lie between about $10^4$ and $10^{-12}$ ohm per cm., but this range is to be regarded simply as illustrative of the problem. Organic semi-conductors may be of the n-type (electron donor) or of the p-type (electron acceptor).

In accordance with the invention there are provided novel polymer compositions comprising a combination of a polymerization olefinically unsaturated monomer with a polymeric substituted phosphorus nitride. These polymer compositions, in accordance with the invention, when subjected to ionizing radiation, acquire improved electrical conductivity, rendering them suitable for use as organic semi-conductors.

It has not been definitely established whether the polymer combination is a copolymer or a blend of the ethylenically unsaturated monomer and the phosphorus nitride. Accordingly, the product of polymerization is referred to herein as a polymer combination.

The irradiated polymer combinations may readily be obtained in the form of shaped articles, such as sheets, thin films, filaments, and the like.

The general method of preparation of the novel polymer combinations of the invention includes the steps of polymerizing an ethylenically unsaturated monomer in the presence of a substituted phosphorus nitride and in the presence of a suitable polymerization catalyst for the ethylenically unsaturated monomer. Mass or bulk polymerization is the preferred method of polymerization of the monomer. The resulting polymer combination is then subjected to ionizing radiation of any desired type by incorporating into the polymer combination an ionizing radiation emissive substance. This is advantageously carried out by dissolving both the polymer combination and the emissive substance in a common solvent. In order to control the conductivity of the resulting composition more closely, there may also be incorporated into the polymer combination a small amount of a metal salt of an inorganic acid, particularly a salt which is soluble in the solvent medium employed for incorporating the emissive substance.

Olefinically unsaturated monomers which are suitable for polymerization in accordance with the invention include both aliphatic and aromatic monomers. Examples of such monomers include styrene, and the nitriles of $\alpha$, $\beta$-unsaturated acids, such as acrylonitrile, methacrylonitrile, fumaronitrile, the nitriles of maleic, mesaconic, itaconic, citraconic, and like acids; esters, amides, and other derivatives of acrylic, methacrylic, and other $\alpha$-substituted acrylic acids, such as the lower alkyl esters of acrylic and methacrylic acids, for example, methyl acrylate, ethyl acrylate, methyl methacrylate, ethyl methacrylate, propyl methacrylate, and butyl methacrylate, and the amides acrylamide and methacrylamide.

The polymerization of the ethylenically unsaturated monomer is carried out in accordance with conventional methods employing bulk or mass polymerization, in the presence of a free radical or similar type polymerization catalyst. Suitable catalysts of the free radical type include both peroxide type catalysts and azo types. The peroxide type catalysts which may be employed include benzoyl peroxide, di-tertiary-butyl peroxide, tertiary butyl hydroperoxide, diacetyl peroxide, dilauroyl peroxide, cumene hydroperoxide, hydrogen peroxide, potassium persulfate, and sodium perborate. Azo type catalysts include azomethane, $\alpha$, $\alpha'$-azodi-isobutyro-nitrile, and the like. The amount of catalyst may be varied over a wide range, the amount preferably being from about 1% to about 5% by weight of the monomer.

The polymerization of the ethylenically unsaturated monomer, in accordance with the invention, is carried out in the presence of a substituted phosphorus nitride. The ethylenically unsaturated monomer and the phosphorus nitride are employed in a ratio ranging between about 3 and about 7 parts by weight of the monomer per 1 part of phosphorus nitride, and preferably between about 4.5 and about 5.5 parts by weight of monomer per 1 part of phosphorus compound.

The substituted phosphorus nitrides which may be employed to prepare polymer combinations in accordance with the invention may be monomers when such exist as stable compounds, but are generally polymeric forms, such as the timer or the tetramer, or higher polymers. They are known compounds and are commercially available.

The substituted phosphorus nitrides have the general formula $(PNX_2)_n$, wherein X is a substituent such as halogen amino, alkyl, alkoxy, and aryl, and n is an integer denoting the degree of polymerization.

A typical example of a substituted phosphorus nitride which may be employed in accordance with the invention is phosphonitrilic chlorine. The monomeric form of this compound, which is unstable, may be prepared by treating phosphorus nitride with chlorine, or by reacting phosphorus pentachloride with ammonium chloride. The stable lower polymers, such as the trimer and the tetramer, are solids having melting points of 114° C. and 123.5° C., respectively. Higher polymers up to and including the heptamer are also known. The manufacture of these compounds is disclosed, for example, in U.S. Patents No. 2,788,286 and No. 2,872,283. Other phosphonitrilic halides may also be employed, such as polymeric phosphonitrilic bromide and fluoride.

Other phosphorus nitrides which may be employed include the amino derivative $[PN(NH_2)_2]_n$, the methoxy derivative $[PN(OCH_3)_2]_n$, the methyl derivative $[PN(CH_3)_2]_n$, and the phenyl derivative $[PN(C_6H_5)_2]_n$, wherein $n$ is generally 3 or 4.

The polymerization temperature may be varied within wide limits. Generally a temperature range of about 35° C. to about 90° C. is satisfactory. The mixture of ethylenically unsaturated monomer, substituted phosphorus nitride, and catalyst is placed in a suitable vessel, which is flushed with an inert gas to remove air. The vessel and contents are heated to the selected temperature. As the reaction progresses a generally whitish polymeric mass forms. Agitation is preferably employed to prevent localized overheating. Any excess of unpolymerized monomer remaining is removed by evaporation. The resulting polymer blend is ready for the irradiation step.

The polymer combination obtained as previously described is subjected to ionizing radiation in order to convert it into a product having semi-conductor properties, employing for this purpose, a radiation emissive substance. The choice of ionizing radiation emissive substance is made in accordance with the desired type of radiation, which may be, for example, of the alpha, beta, or gamma types. These types of radiation may be supplied by naturally occurring radioactive materials, such as radium or uranium or their compounds, or by fission by-products of processes generating atomic energy, or other fissionable materials.

Thus, for example, there may be employed as a source of alpha radiation, a salt of naturally occurring uranium (U-238), such as uranyl nitrate. Similarly, there may be employed as a source of beta-radiation, a salt of a radioactive element such as prometheum, strontium-90, yttrium-90, cerium-144 or germanium-68, for example prometheum chloride. The middle of the range radiation intensity of uranyl nitrate is about 3 millicuries, while that of prometheum chloride is about 1 millicurie. Another source of beta-radiation is tritium, which may be applied as tritiated water or as a tritiated carrier, such as tritium containing ethyl stearate or tritium containing vaseline, providing an intensity in the range of 10 microcuries to 1 curie.

As a source of gamma radiation there may be employed materials made radioactive by exposure to neutron radiation, for example, salts of radioactive cobalt (Co-60) or europium-152 or 154.

The amount of ionizing radiation emissive substance to be employed may vary widely, but should be at least sufficient to bring about a significant increase in the conductivity of the polymer combination. Thus, for example, there may be used a solution of uranyl nitrate having a specific radiation intensity of 9 millicuries per gram, in a concentration of 2 parts by weight per 3 parts of polymer blend. Similarly, prometheum chloride solution in water may be employed in an amount to provide a radiation intensity of 1 millicurie per 3 grams of polymer combination. In general, the mount of emissive substance, whether in the form of an aqueous solution or distributed within a carrier, should be enough to provide at least about 0.1 millicurie per gram of polymer combination.

The incorporation of the radiation emissive substance into the polymer combination is advantageously carried out by dissolving both the polymer combination and the emissive substance in a solvent medium which is a solvent for both materials. The concentration of the polymer combination in the solvent medium is adjusted to a range between about 10% and about 30% by weight, preferably about 20% by weight of the solvent medium. The emissive substance is introduced into the resulting solution.

However, if desired, the emissive substance may also be introduced into the polymer combination by incorporation with the original polymerization mixture, or during any stage of the polymerization process.

Where a solvent medium is employed, the solvent may be a dialkylamide of a lower aliphatic carboxylic acid, such as dimethylformamide or dimethylacetamide. Other solvents which may be used include dimethyl sulfoxide, N-methylpyrrolidone, and tripropylene carbonate. The preferred solvent is dimethylformamide.

The resulting solution of polymer combination and emissive substance is then cast or extruded into shaped articles, such as thin films, in accordance with conventional procedures.

There may also be added to the solution of polymer combination and emissive substance, a small amount, between about 0.1% and about 2% by weight of the polymer combination, and preferably about 0.5%, of a metal salt of an inorganic acid which is soluble in the solvent medium employed. The metal salt may be added before or after the introduction of the emissive substance. Examples of suitable metal salts include the halides, nitrates, and to a lesser extent the sulfates, of the alkali metals, such as ammonium, potassium, and sodium, calcium nitrate, and salts of heavy metals, such as cobalt, cadium, chromium, iron (ferric), mercury (ic) nickel, tin (stannous) and zinc. Specific examples of metal salts include aluminum nitrate, cadmium nitrate, cobalt chloride and nitrate, chromium chloride, copper nitrate, mercuric chloride, potassium iodide, manganese chloride, sodium and potassium thiocyanates, sodium iodide, ammonium bromide, ammonium nitrate, nickel chloride and nitrate, stannous chloride, zinc chloride, nitrate and sulfate. The preferred salt is zinc chloride.

There may also be introduced into the polymer combination semi-conductor mixture, other materials which impart specifically desired properties. Thus, for example, there may be included, in proportions up to about 60% by weight of the polymer combination, a material which aids in promoting adherence to metal surfaces, such as molybdenum disulfide $MoS_2$.

The resulting polymer combination containing emissive materials possess conductivities of an order of magnitude sufficient to permit them to function effectively as semi-conductors. Thus, whereas the resistance of the polymer combination in the absence of the emissive substance is of the order of $10^9$ ohms, in the presence of the emissive substance this value becomes about $10^4$ to $10^6$ ohms. The resulting semi-conductors are predominantly of the p-type.

The polymer combination-emissive substance composition may be cast or extruded onto a flat surface with evaporation of the solvent. This operation may be repeated until the desired film thickness is attained, for example a layer about 0.2 mm. in thickness. The layer of film may then be cut, punched, or otherwise reduced to the desired size and shape.

The semi-conductive layers thus produced may be utilized directly in the form in which they are obtained. For example, two types of layers containing respectively an alpha- and a beta-emissive substance may be stacked alternately and then compressed to provide a lamination. For this purpose the respective alternate films may be produced by casting the respective solutions in alternating sequence and evaporating the solvents therefrom. The evaporation of the solvents may be carried out for example with the aid of infrared heating devices. The polymer combination material may also be compressed or molded after evaporation of the solvent.

The preparation of the novel semi-conductor compositions of the invention is illustrated by the following examples, which are not, however, to be considered as limiting:

*Example 1*

150 g. of acrylonitrile monomer was mixed with 30 g. of phosphonitrilic chloride (trimer). The mixture was introduced into a balloon flask provided with agitator and the mixture was thoroughly stirred to effect uniform distribution of the phosphonitrilic chloride in the acrylonitrile. Then there was introduced 6 g. of benzoyl peroxide as polymerization catalyst and the flask was flushed with nitrogen or carbon dioxide to be free of all traces of air. The flask was placed on a water bath and the contents maintained at a temperature of about 75° C. until formation of polymer was noted. Caution was taken to prevent excessive temperature rise by replacing the hot water of the bath with cold water to limit the heating. As the reaction progressed a white polymer appeared and the viscosity of the mass increased, agitation being continued to prevent hot spots. An excess of unpolymerized acrylonitrile remaining in the flask was removed by evaporation. The resulting polymer combination was a white powder. It was dissolved under reflux in dimethylformamide at the boiling point of this solvent (152–153° C.) and at a concentration of 2 g. per 10 cc.

(a) Into one portion of the resulting solution an alpha-radiation emissive substance was introduced, using for this purpose a solution of uranyl nitrate having a specific activity of 9 millicuries per gram, in dimethylformamide, in a concentration of 1 g. uranyl nitrate per 8 cc. of solvent. The uranyl nitrate dissolved easily in this solvent on agitation at ordinary temperature. This solution was added to the polymer combination solution in a proportion such that the added uranyl nitrate was in a concentration of 2 parts by weight per 3 parts of the polymer combination. The two solutions mixed readily at ordinary temperature.

(b) Into another portion of the polymer combination solution originally obtained there was introduced a beta-radiation emissive substance comprising prometheum chloride solution in water, by pouring the radioactive solution into the polymer combination solution in proportions such that the prometheum was present in an amount to provide an activity of 1 millicurie per 3 g. of the polymer combination. The dissolution was readily effected within the range of proportions specified.

To each of the resulting solutions (a) and (b) a solution of zinc chloride in dimethylformamide was added, so that the concentration of zinc chloride was 0.5% by weight of the polymer combination. Films were then prepared by casting the respective solutions on flat surfaces and evaporating the solvent by infrared heating, to obtain films about 0.2 mm. thick.

*Example 2*

Following the procedure set forth in Example 1, 80 grams of acrylonitrile were heated with 20 grams of phosphonitrilic methoxide, and 3 grams of benzoyl peroxide catalyst were added. Alpha- and beta-emissive substances, respectively uranyl acetate and prometheum chloride solution were added to a solution of the polymer combination in dimethylformamide as previously described, and the solutions were cast into thin films.

*Example 3*

75 grams of methacrylonitrile were heated with 25 grams of phosphonitrilic chloride trimer at about 90° C. and 5 grams of tertiary butyl hydroperoxide catalyst, as described in Example 1. The polymer combination formed was dissolved in dimethylformamide and an amount of tritiated water having an activity of 10 curies per 50 ml. was added, said amount being 0.01 ml. of this water per 3 grams of solid in 30 cc. of dimethylformamide. The solution was treated with zinc chloride and cast into films as described in Example 1.

Products obtained according to Example 1 comprising two laminated layers each 0.2 mm. in thickness, one containing uranyl nitrate, and the other prometheum chloride, the surface area of the layers being about 0.3 sq. cm., were subjected to resistivity measurements. It was found that the resistivity was in the range of 1,000 to 40,000 ohm-cm. The resistivity of a layer of film 0.2 mm. thick containing a single emissive substance for either alpha or beta radiation is of similar order of magnitude.

The preparation and structure of a rectifier employing the novel semi-conductor materials of the invention will be more readily understood by reference to the accompanying drawing, taken with the ensuing description. In the drawing, the point contact rectifier unit is shown in cross-section at 1.

In order to prepare a rectifier employing the novel semi-conductor compositions of the invention, the polymer blend film, containing the ionizing radiation emissive substance, and having a suitable thickness, for example about 0.2 mm., is coated on one side with a paint of a conductive material, suitably a noble metal paint, such as a silver paint of the type conventionally employed in the manufacture of rectifier devices of the character in question. After the coat of paint has dried the film is contacted with and pressure-bonded to a metallic support or base, preferably rigid, and composed of a noble metal, such as silver, gold, platinum, or the like. The metal paint provides good electrical contact between the coated polymer blend film and the metal base. The metal base and the exposed surface of the semi-conductor film are then coated with conductive paint, e.g. silver paint, over its entire surface. The resulting assembly may then be made into a point contact rectifier on a junction rectifier. In the former case, the assembly is placed in a protective insulating sheath which further serves to support a metal point electrode applied under pressure against the conductive paint coated surface of the film.

In the drawing, the rectifier unit 1 is shown as including semi-conductor films 2 and 3, having integrally combined, respectively, alpha and beta emissive radiation substances, the films being coated with conductive paint layers 4, and being bonded to metal bases 5. The assembly is included within protective sheath 6.

The point electrode 10 and the metal support or base 5 are in turn connected to a pair of leads 7 providing connections of the resulting rectifier device with an external circuit, such as an alternating current source 8 and an electrical load 9. The electrical circuit is completed by a line connecting the alternating current source and resistor or load. The alternating current source can be of any suitable voltage, such as 110 volt, 60 cycle.

The point electrode may be a wire of silver, tungsten, stainless steel, or any other suitable metal or alloy such as is conventionally employed for the construction of point electrodes. Preferably the wire is coiled into a helix or spiral to constitute a spring applied under suitable pressure against the contact surface, but a whisker type may also be used. The major dimension of the contact area present between the tip of the point electrode and the metal-coated semi-conductor film may be in the range of from a few microns to a few hundredths of a millimeter. To produce a junction rectifier a metallic base or support is brought into contact with the side of the film opposite to the side already having a base and is bonded thereto by pressure. Alternatively, the opposite sides of the film may both be coated initially with conductive paint and the two bases applied simultaneously. Wires may then be attached to the two bases in a manner described above with respect to the base in the point contact device.

Rectifier devices of a similar type may be produced wherein there is a plurality of laminated films rather than a single film between the metal base and the point electrode.

Tests have demonstrated that the direct resistivity value in such rectifier devices is within a range of from 1 to $40 \times 10^3$ ohm-cm., depending upon the particular sample, whereas reverse resistivity is about 10 times greater, thus clearly manifesting the asymmetry in conduction properties present in rectifier devices produced in accordance with the invention. Such rectifier devices have been successfully employed as detectors in radio receiver circuits of a conventional type.

What is claimed is:

1. Method for the preparation of a polymer composition which comprises polymerizing an olefinically unsaturated monomer selected from the group consisting of aliphatic and aromatic monomers in the presence of a polymeric substituted phosphorus nitride having the general formula $(PNX_2)_n$ wherein X is a member selected from the group consisting of halogen, amino, alkyl, alkoxy and aryl, and $n$ is an integer denoting the degree of polymerization and of a free radical polymerization of a catalyst.

2. Method for the preparation of a polymer composition which comprises polymerizing acrylonitrile in the presence of phosphonitrilic chloride trimer and of a free radical polymerization catalyst for said acrylonitrile.

3. An organic semi-conductor comprising a polymer combination of a polymerized olefinically unsaturated monomer selected from the group consisting of aliphatic and aromatic monomers with a polymeric substituted phosphorus nitride having the general formula $(PNX_2)_n$ wherein X is a member selected from the group consisting of halogen, amino, alkyl, alkoxy and aryl, and $n$ is an integer denoting the degree of polymerization, said polymer combination having incorporated within the body thereof an ionizing radiation emissive substance and a small amount of a metal salt of an inorganic acid.

4. An organic semi-conductor comprising a polymer combination of a polymerized olefinically unsaturated monomer selected from the group consisting of aliphatic and aromatic monomers with a polymeric substituted phosphorus nitride having the general formula $(PNX_2)_n$ wherein X is a member selected from the group consisting of halogen, amino, alkyl, alkoxy and aryl, and $n$ is an integer denoting the degree of polymerization, said polymer combination having incorporated within the body thereof an alpha-radiation emissive substance.

5. An organic semi-conductor comprising a polymer combination of a polymerized olefinically unsaturated monomer selected from the group consisting of aliphatic and aromatic monomers with a polymeric substituted phosphorus nitride having the general formula $(PNX_2)_n$ wherein X is a member selected from the group consisting of halogen amino, alkyl, alkoxy and aryl, and $n$ is an integer denoting the degre of polymerization, said polymer combination having incorporated within the body thereof a beta-radiation emissive substance comprising prometheum chloride.

6. An organic semi-conductor comprising a polymer combination of a polymerized olefinically unsaturated monomer selected from the group consisting of aliphatic and aromatic monomers with a polymeric substituted phosphorus nitride having the general formula $(PNX_2)_n$ wherein X is a member selected from the group consisting of halogen, amino, alkyl, alkoxy and aryl, and $n$ is an integer denoting the degree of polymerization, said polymer combination having incorporated within the body thereof a gamma-radiation emissive substance.

7. The semi-conductor of claim 4 in which the emissive substance is uranyl nitrate.

8. Method for the preparation of an organic semi-conductor which comprises polymerizing an olefinically unsaturated monomer selected from the group consisting of aliphatic and aromatic monomers in the presence of a polymeric substituted phosphorus nitride having the general formula $(PNX_2)_n$ wherein X is a member selected from the group consisting of halogen, amino, alkyl, alkoxy and aryl, and $n$ is an integer denoting the degree of polymerization and a free radical polymerization catalyst, to form a polymer combination, and incorporating within the body of said polymer combination an ionizing radiation emissive substance.

9. Method for the preparation of an organic semi-conductor which comprises polymerizing an olefinically unsaturated monomer selected from the group consisting of aliphatic and aromatic monomers in the presence of a polymeric substituted phosphorus nitride having the general formula $(PNX_2)_n$ wherein X is a member selected from the group consisting of halogen, amino, alkyl, alkoxy and aryl, and $n$ is an integer denoting the degree of polymerization and a free radical polymerization catalyst, to form a polymer combination, and incorporating within the body of said polymer combination an ionizing radiation emissive substance and a small amount of a metal salt of an inorganic acid.

10. The method of claim 9 in which the emissive substance and the metal salt are incorporated in solution in a solvent therefor and for the polymer combination.

11. The method of claim 10 in which the solvent is dimethylformamide.

12. The method of claim 9 in which the amount of metal salt is from about 0.1% to about 2.0% by weight of the polymer combination.

13. A semi-conductor device comprising a plurality of contacting films of a polymer combination of a polymerized olefinically unsaturated monomer selected from the group consisting of aliphatic and aromatic monomers with a polymeric phosphorus nitride having the general formula $(PNX_2)_n$ wherein X is a member selected from the group consisting of halogen, amino, alkyl, alkoxy and aryl, and $n$ is an integer denoting the degree of polymerization, said polymer combination being integrally combined with an ionizing radiation emissive substance and a small amount of a metal salt of an inorganic acid, said films alternately including an alpha-radiation emissive substance and a beta-radiation emissive substance.

14. A point contact rectifier comprising at least one film of a polymer combination of a polymerized olefinically unsaturated monomer selected from the group consisting of aliphatic and aromatic monomers with a polymeric substituted phophorus nitride having the general formula $(PNX_2)_n$ wherein X is a member selected from the group consisting af halogen, amino, alkyl, alkoxy and aryl, and $n$ is an integer denoting the degree of polymerization, said polymer combination being integrally combined with an ionizing radiation emissive substance and a small amount of a metal salt of an inorganic acid, one side of said film being supported on a metal base serving as electrode, and a point electrode being in contact with the opposite side of said film.

15. A point contact rectifier according to claim 14 in which a plurality of laminated films is positioned between the two electrodes.

16. A rectifier comprising at least one film of a polymer combination of a polymerized olefinically unsaturated monomer selected from the group consisting of aliphatic and aromatic monomers with a polymeric substituted phosphorus nitride having the general formula $(PNX_2)_n$ wherein X is a member selected from the group consisting of halogen, amino, alkyl, alkoxy and aryl, and $n$ is an integer denoting the degree of polymerization, said polymer combination being integrally combined with an ionizing radiation emissive substance and a small amount of a metal salt of an inorganic acid, said film being supported between two metal plates serving as electrodes.

17. The combination according to claim 16 wherein a plurality of laminated films is supported between said plates.

18. A rectifier comprising a body of a polymer combination of a polymerized olefinically unsaturated monomer selected from the group consisting of aliphatic and aromatic monomers with a polymeric substituted phosphorus nitride having the general formula $(PNX_2)_n$ wherein X is a member selected from the group consisting of halogen, amino, alkyl, alkoxy and aryl, and $n$ is an integer denoting the degree of polymerization, said polymer blend having incorporated with the body an ionizing radiation emissive substance and a small amount of a metal salt of an inorganic acid, and electrodes secured to opposite sides of said body.

19. An organic semi-conductor comprising a polymer combination of a polymerized olefinically unsaturated monomer selected from the group consisting of aliphatic and aromatic monomers with a polymeric substituted phosphorus nitride having the general formula $(PNX_2)_n$ wherein X is a member selected from the group consisting of halogen, amino, alkyl, alkoxy, and aryl, and $n$ is an integer denoting the degree of polymerization, said polymer combination having incorporated within the body thereof a beta-radiation emissive substance comprising a tritiated carrier.

References Cited by the Examiner

UNITED STATES PATENTS

| | | | |
|---|---|---|---|
| 837,616 | 12/1906 | Dunwoody | 317—237 |
| 2,745,973 | 5/1956 | Rappaport | 310—3 |
| 2,789,240 | 4/1957 | Cohen | 250—106 |
| 2,847,585 | 8/1958 | Christian | 310.3—3 |
| 2,876,368 | 3/1959 | Thomas | 310—3 |
| 2,998,550 | 8/1961 | Collins et al. | 250—106 |

OTHER REFERENCES

Spindler et al.: Die Makromolekulare Chemie, volume 43, pp. 237–241, April 1961.

JAMES D. KALLAM, *Primary Examiner.*

A. M. LESNIAK, *Assistant Examiner.*